(No Model.)

3 Sheets—Sheet 1.

H. M. CORMACK.
GANG PLOW.

No. 291,156. Patented Jan. 1, 1884.

Witnesses:
Walter E. Lombard.
E. A. Hemmenway.

Inventor:
Hamilton M. Cormack

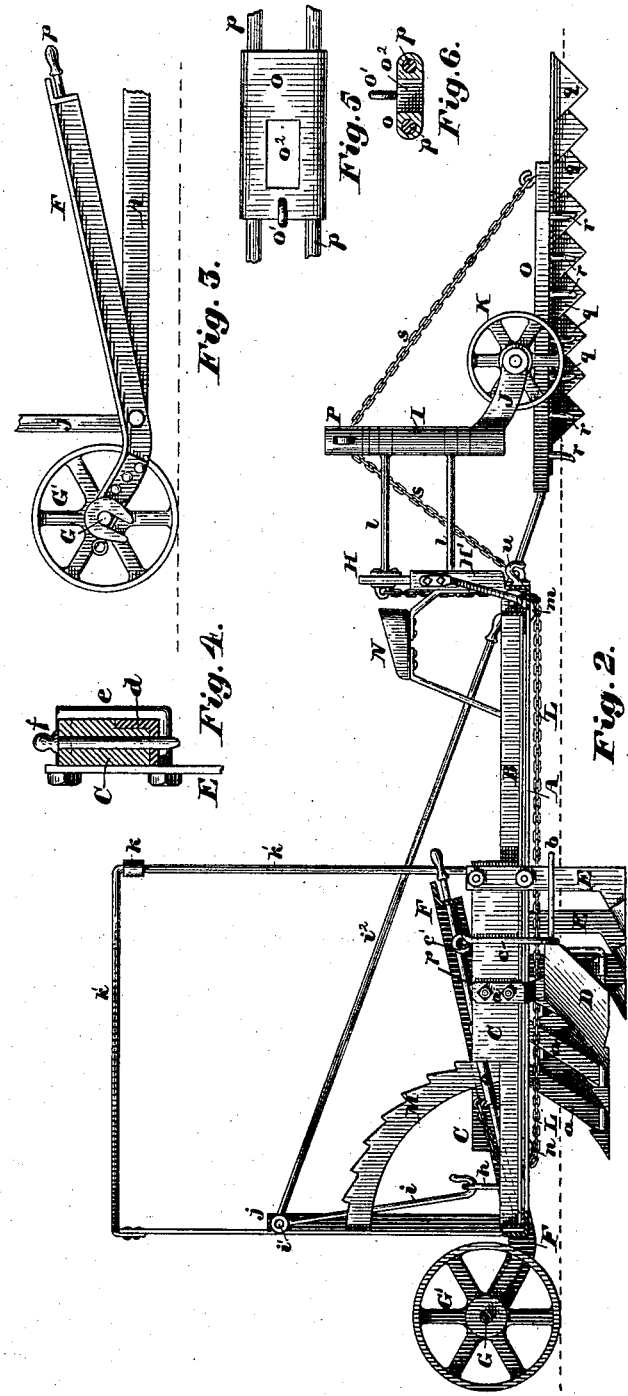

(No Model.) 3 Sheets—Sheet 3.

H. M. CORMACK.
GANG PLOW.

No. 291,156. Patented Jan. 1, 1884.

Witnesses:
Walter E. Lombard.
E. A. Hemmenway.

Inventor:
Hamilton M. Cormack.

UNITED STATES PATENT OFFICE.

HAMILTON M. CORMACK, OF MALDEN, MASSACHUSETTS.

GANG-PLOW.

SPECIFICATION forming part of Letters Patent No. 291,156, dated January 1, 1884.

Application filed September 11, 1883. (No model.)

*To all whom it may concern:*

Be it known that I, HAMILTON M. CORMACK, of Malden, in the county of Middlesex and State of Massachusetts, have invented certain new and useful Improvements in Gang-Plows, of which the following, taken in connection with the accompanying drawings, is a specification.

To render the cultivation of the soil by steam-power practical and profitable, it is necessary to combine with a suitable engine an implement that will deeply stir, invert, and thoroughly pulverize the soil, to prepare it for the seeding or planting of crops on a large area.

To produce an implement that will accomplish this object is the object of my present invention, which relates to gang-plows; and it consists in certain novel features of construction and arrangement of parts, which will be best understood by reference to the description of the drawings, and the claims to be hereinafter given.

Figure 1:
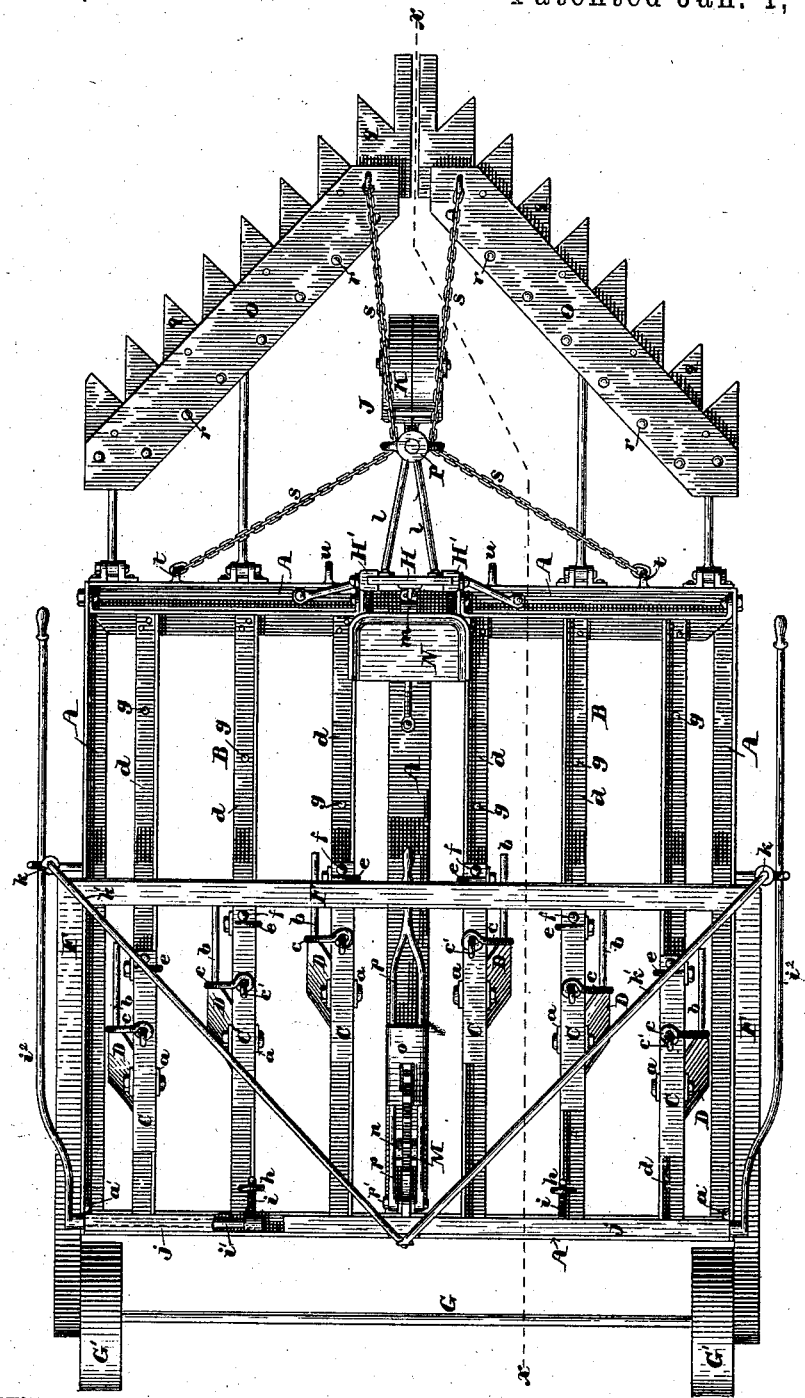
Figure 7:
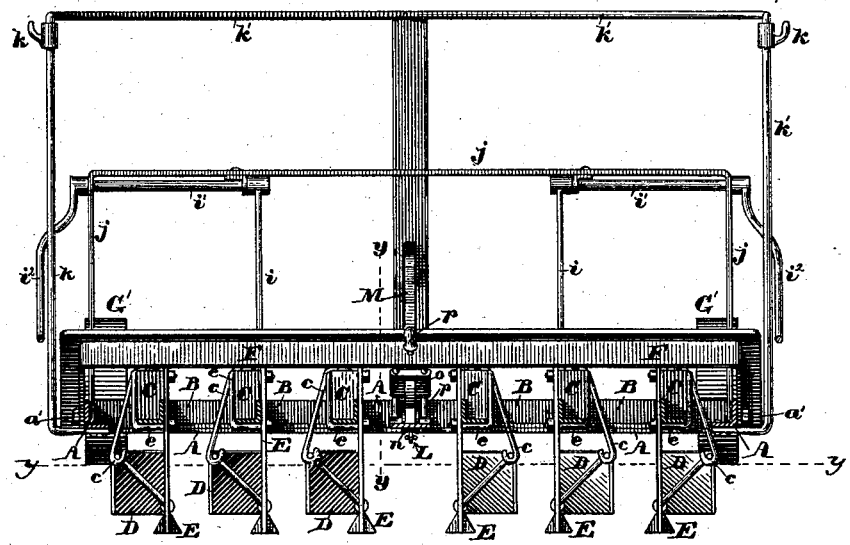
Figure 8:
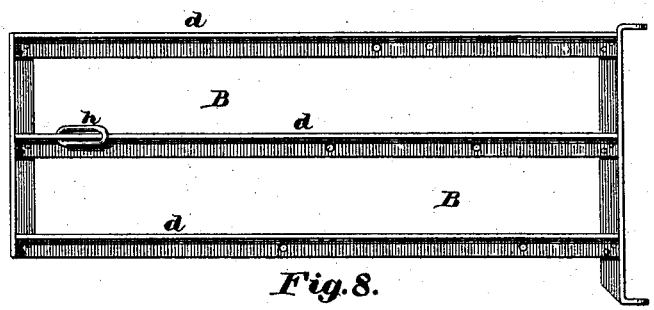
Figure 9:
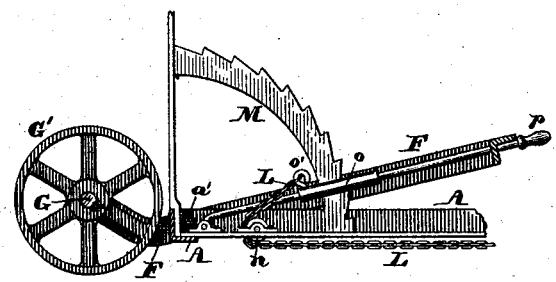
Figures 10, 11:
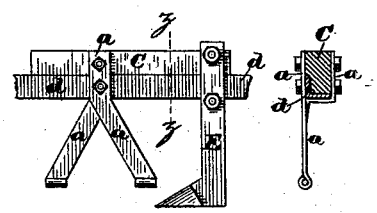

In the drawings, Figure 1 represents a plan of my improved gang-plow. Fig. 2 represents a sectional elevation of same, the section being taken on line $x$ $x$ on Fig. 1. Fig. 3 represents a detail of construction, which will be more fully described hereinafter. Fig. 4 represents a section through one of the plow-carrying frames and the bar, to which it is adjustably secured. Figs. 5 and 6 are respectively a plan and section of the sliding catch. Fig. 7 is a transverse vertical section of Figs. 1 and 2, taken in the rear of the plows, and looking toward the front. Fig. 8 is a plan of one of the auxiliary or plow-carrying frames. Fig. 9 is a partial vertical longitudinal section on line $y$ $y$ on Fig. 7. Fig. 10 is a detail showing the plow-carrying head and bracket in elevation, and Fig. 11 is a vertical section on line $z$ $z$ on Fig. 10.

A is the main frame of my improved gang-plow, which is preferably made of angle-iron, thereby giving combined lightness and strength, and has placed above it, and hinged by their rear ends to its rear end, the two auxiliary frames B B, in such a manner that their front ends may be raised to an angle to the frame A, said frames B moving about their hinged connections to the frame A. The frames B B are each provided with two or more parallel longitudinal bars, $d$ $d$, upon each of which is mounted, so as to be adjustable thereon, the plow-head C, having secured thereto by means of the bracket $a$, swivel-plow D, of the usual construction, and adapted to be moved about its hinged connections by means of the handle $b$, firmly secured to said plow. The plow D is adapted to be held in position on either side of the bracket $a$ by means of the bent hook $c$, secured at $c'$ to the sliding head C, in such a manner as to be readily transferred from one side of the head C to the other and engage with the handle $b$ on either side, thereby holding the plow in position. The brackets $a$ $a$ are divided into two parts at their upper ends, an arm of which passes on either side of the longitudinal bars $d$ $d$ of the frame B, and are secured to the sliding heads C C by suitable bolts and nuts, as shown in Fig. 11. This construction of the bracket $a$ is adapted to guide the sliding head C while being moved lengthwise of the bar $d$, which object is further assisted by the staple $e$, passing around said bar $d$ and head C, and having its ends firmly secured to the subsoil-plow E in any suitable manner. The ends of the staple $e$ may be provided with a male thread, upon which a nut is adapted to operate to firmly clamp the sliding head C to the bar $d$, thereby checking all lengthwise movement of said head C on the bar $d$. The subsoil-plow E is placed immediately in the rear of the plow D, and is adapted to follow in its furrow to break up and pulverize the soil to a depth greater than is done by the turning-plow D. With the bracket $a$ and staple $e$ as guides the sliding-head C may readily be moved along the bar $d$ and secured thereto in any required position by the pin $f$, passing through the head C, and entering the hole $g$ of the bar $d$, which object may be further assisted by clamping tightly the staple $e$, all as shown in Figs. 4, 10, and 11.

The object of having the plows D D fixed in any required position is obvious, and the object of having them readily adjustable along the bars $d$ $d$ will be hereinafter stated.

To the front end of the frames B B are attached the rings or links $h$ $h$, which engage with the hooked rocker-arms $i$ $i$, firmly secured to the rock-shafts $i'$ $i'$—one on each side of the center of the machine—which are mounted in suitable bearings in the vertical frame $j$, firmly secured to the upper side of the front end of the frame A, and have provided on their outer ends the hand-levers $i^2 i^2$, by which the rocker-arms $i\ i$, frames B B, and plows D D are raised, said arms $i\ i$, frames B B, and plows D D, being held in a raised position by resting said hand-levers $i^2\ i^2$ upon the hooks $k\ k$, secured to the upright supports $k'\ k'$, projecting upward from the frame A. As the rocker-arm $i$ is raised, the link $h$ is also raised, carrying with it the front end of the frame B, by which means the plows D D are lifted, so as not to come in contact with the soil over which the vehicle may pass.

Owing to the arcs in which the rocker-arm $i$ and the frame B move, it is necessary to have a movable connection between the two. Therefore the link $h$ is made in such a manner that it may slide along the arm $i$ toward its fulcrum as said arm $i$ is raised. This arrangement is found to be very desirable, especially so where the soil is found to be so stiff that trouble is found in using the full number of plows with which the vehicle is provided. At such a time the shares of the plows on the frames B B are placed so that they will turn the soil outwardly from the center of the vehicle. The operator then raises one of the hand-levers $i^2$ and places it upon the hook $k$, thereby raising the plows D D, so that their points clear the surface of the ground. Supposing the left frame B be so lifted, the plows of the right frame cut furrows, turning the soil outwardly, each plow turning the soil into the furrow cut by the plow next preceding it. When the vehicle has crossed the field, it turns to the left, so that the left-hand frame is next to the furrows just cut. The operator then allows the plows on said frame— i. e., the left-hand frame—to engage with the soil, and at the same time he raises the plows of the right-hand frame and secures them, so that they cannot interfere with the soil. The vehicle now being started on its return, the plows of left-hand frame turn their furrows in the same direction, as was done by the right-hand frame, thus making an even job. The advantages to be derived from such a construction as this, where the plows do not have to be swiveled at every turn, are obvious and need not therefore be mentioned here. When the soil is quite soft, the full number of plows may be used by adjusting them in position on the bars $d\ d$, so that the whole series shall be arranged in a straight diagonal line across the frame in either direction, the shares of all the plows being so turned in the same direction that each plow will turn the soil into the furrow made by the plow next preceding it.

To the front end of the frame A is pivoted, at $a'$, the lever-frame F, which is provided at its outer ends with suitable bearings, which may be connected either to the axle G, having mounted thereon the wheels $G'\ G'$, or to a traction-engine, if so desired.

To the rear of the frame A are firmly secured the vertical guides $H'\ H'$, in which is fitted the plate H, adapted to be vertically moved therein, and said sliding-frame H having securely attached thereto, by means of the ties $l\ l$, the post I, having mounted on its lower end the swivel-fork J, provided with suitable bearings, in which is mounted the caster-wheel K.

To the front side of the slide H is secured the chain L, which passes downward through a suitable opening in the frame A, around the sheave $m$, along the under side of the frame A, around another sheave, $n$, through a suitable opening in the frame A, and is securely fastened by its other end to the sliding catch $o$ by means of the eye $o'$, said catch $o$ being mounted upon the forked lever $p$, pivoted at $p'$, and connected to the frame F at its rear end, so as to move therewith.

To the center of the frame A, near its front end, is secured the ratchet-toothed segment M, which passes through the hole $o^2$ of the catch $o$, which catch is held firmly in place against the edge of the segment M by means of the tension of the chain L, which is held taut by the weight of the frame A and the parts thereon, as shown in Figs. 2 and 9. By means of this construction the plows may readily be adjusted to any reasonable depth of furrow by simply raising or lowering the lever $p$ and its frame F. For instance, if the operator desires to cut a furrow somewhat less in depth than would be cut by the plows in a position as shown in the drawings, he lifts the frame F, so that the catch $o$ may engage with the required tooth of the segment M, thereby drawing on the chain L, so that the frame A is lifted at its rear end on the sliding frame H, as is obvious, while the same movement of the frame F about its axis G lifts the pivotal connection $a'$, and with it the front end of the frame A, the weight of the whole frame and its connections tending to equalize the two movements and keep the same in a horizontal position.

To the rear of the frame A is attached, in any suitable manner, the seat N, on which the driver or operator may ride when the vehicle is in motion.

To the rear of the frame A are attached, by suitable hinges, the harrows O O, which are provided with the slicing-blades $q\ q$ and swivel-teeth $r\ r$, adapted to operate upon the overturned soil in a well-known manner. These harrows are provided with the chains $s\ s$, which pass through the eyes of the swivel-head P, and are attached to the frame A by means of suitable eyes, $t\ t$. The object of these chains is to enable the harrows to be lifted from the ground and held in a raised position by passing said chains under the hooks $u\ u$, also secured to the frame A, as shown in Fig. 1. When only three plows are in use, the harrow, which follows in a line with the frame B, that carries the plows not in use, should also be lifted and held in a raised position, as described.

When traveling from one point to another over rough roads, as is often necessary, all of the plows and both harrows may readily be raised, so that no injury may occur to them.

By this construction of a gang-plow, the work of cultivating the soil and preparing it for seeding may be accomplished in a much cheaper, more rapid, and more effective manner than has heretofore been accomplished.

What I claim as new, and desire to secure by Letters Patent of the United States, is—

1. In a gang-plow, the combination of the frame A, the auxiliary frames B B, each pivoted thereto at one end, and provided with two or more plows, D D, and means for independently raising or lowering said frames about their axes, and holding the same in any required position, substantially as and for the purposes described.

2. In a gang-plow, the combination of the frame B, pivoted to the frame A, and provided with a set of plows, the ring $h$, secured thereto, the hooked rocker-arm $i$, the shaft $i'$, mounted in suitable bearings, the hand-lever $i^2$, the hook $k$, and the support $k'$, all arranged and adapted to operate substantially as and for the purposes described.

3. In a gang-plow, the combination of the frame A, the auxiliary frames B B, each provided with two or more swivel-plows, and means of adjusting said plows lengthwise of the frames B, whereby said two gangs of plows are adapted to be used independently of each other, and to turn their furrows in opposite directions, or to be used in conjunction, and to turn their furrows in the same direction, but toward either side of the frame A, substantially as and for the purposes described.

4. In a gang-plow, the combination of the frame A, the lever-frame F, pivoted thereto, and fulcrumed upon the axle G, the toothed segment M and the catch $o$ for maintaining the frame F in any required position about its axis, substantially as and for the purposes described.

5. In a gang-plow, the combination of the frame A, the lever-frame F, pivoted thereto and fulcrumed upon the axle G, the toothed segment M, the forked rod $p$, the catch $o$, the support H I J K, the chain L, and the sheaves or pulleys $m$ and $n$, all arranged and adapted to operate substantially as and for the purposes described.

6. In a gang-plow, the combination of the frame A, two harrows, O O, arranged obliquely to said frame in opposite directions and pivoted thereto, the chain $s\ s$, the supporting swivel-head P, and the hooks $u\ u$, as a means for raising said harrows, and holding them from contact with the ground, substantially as and for the purposes described.

7. In a gang-plow, the combination of the slide H, adapted to move in suitable guides secured to the frame A, the bearing I, secured thereto and provided with the forked bearing J and wheel K, and means for vertically adjusting said slide H and holding it in a fixed position, substantially as and for the purposes described.

In testimony whereof I have signed my name to this specification, in the presence of two subscribing witnesses, on this 8th day of September, A. D. 1883.

HAMILTON M. CORMACK.

Witnesses:
    WALTER E. LOMBARD,
    E. A. HEMMENWAY.